(12) United States Patent
Sidelkovskiy et al.

(10) Patent No.: US 11,028,779 B2
(45) Date of Patent: Jun. 8, 2021

(54) GAS TURBINE ENGINE BYPASS DRAINAGE SYSTEMS

(71) Applicant: United Technologies Corporation, Farmington, CT (US)

(72) Inventors: Dmitriy B. Sidelkovskiy, Ellington, CT (US); James Evans, South Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 185 days.

(21) Appl. No.: 16/263,268

(22) Filed: Jan. 31, 2019

(65) Prior Publication Data

US 2020/0248628 A1 Aug. 6, 2020

(51) Int. Cl.
*F01D 25/24* (2006.01)
*F02C 7/30* (2006.01)
*F01D 25/32* (2006.01)

(52) U.S. Cl.
CPC ............... *F02C 7/30* (2013.01); *F01D 25/24* (2013.01); *F01D 25/32* (2013.01); *F05D 2260/602* (2013.01); *F05D 2260/608* (2013.01)

(58) Field of Classification Search
CPC ..... F01D 25/32; F01D 25/24; F05D 2260/602
See application file for complete search history.

(56) References Cited

U.S. PATENT DOCUMENTS

| | | | |
|---|---|---|---|
| 3,371,482 A | 3/1968 | Camboulives et al. | |
| 4,163,366 A | 8/1979 | Kent | |
| 5,054,282 A * | 10/1991 | Costa | F02C 7/232 60/39.094 |
| 5,104,069 A | 4/1992 | Reising | |
| 8,572,984 B2 * | 11/2013 | Sheaf | B64C 7/02 60/782 |
| 9,816,438 B2 * | 11/2017 | Teia Dos Santos Medes Gomes | F01D 11/24 |
| 10,024,188 B2 * | 7/2018 | Pujar | F01D 25/145 |
| 2010/0293964 A1 | 11/2010 | Sheaf et al. | |
| 2013/0247538 A1 | 9/2013 | Roche et al. | |
| 2015/0246731 A1 | 9/2015 | Tateiwa | |
| 2018/0283217 A1 * | 10/2018 | de Pau, Jr. | B64C 1/1453 |

FOREIGN PATENT DOCUMENTS

EP 1544106 A1 6/2005

OTHER PUBLICATIONS

European Search Report for European Application No. 20155000.1, International Filing Date Jan. 31, 2020, dated Jun. 16, 2020, 6 pages.

* cited by examiner

*Primary Examiner* — Todd E Manahan
*Assistant Examiner* — Thuyhang N Nguyen
(74) *Attorney, Agent, or Firm* — Cantor Colburn LLP

(57) ABSTRACT

Core housings for gas turbine engines are described. The core housings include a housing surface defining an exterior surface of the core housing, a housing aperture arranged on the housing surface, the housing aperture configured to enable fluid communication between an external environment and an interior of the core housing, a drainage hole arranged upstream relative to the housing aperture, the drainage hole configured to enable draining of a fluid from an interior of the core housing to the external environment, and a redirection device arranged to receive a fluid from the drainage hole and direct such fluid away from the housing aperture.

20 Claims, 7 Drawing Sheets

GAS TURBINE ENGINE BYPASS DRAINAGE SYSTEMS

BACKGROUND

Illustrative embodiments pertain to the art of turbomachinery, and specifically to drainage systems for gas turbine engines.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The elements of the gas turbine engine, i.e., core components, may be housed within a nacelle. In operation, fluids, such as flammable fluids, may drain from the core compartments through joints, seams, holes, etc. The drained fluids will subsequently flow along an exterior surface of the nacelle can come in to nacelle ventilation holes (e.g., scoops) and/or other holes or apertures (e.g., inlets or outlets) arranged to fluidly connected an exterior environment with the core components (e.g., fan duct apertures). The fluid may reenter the nacelle at these holes/apertures and interact with the core components. Such interaction may be detrimental to operation of the engine and/or may be a safety hazard (e.g., depending on the type of fluid that reenters the engine (e.g., fire, corrosion, ice, etc.)).

Drain holes may be arranged on a low point of the nacelle, e.g., on an inner fixed structure of an engine, and may be arranged along a bypass duct of the engine. That is, the fluid will flow to a low point within the nacelle and then may leak through the joints, seams, or holes, to subsequently enter the bypass duct on the exterior of the nacelle structure. In some engine/nacelle configurations/designed, drain holes may be arranged upstream of core compartment ventilation/scoop holes. Typically, there is a low bifurcation at the low part of the bypass duct, which deviates or splits the air flow stream through the bypass duct. Such air flow streamlines deviation and can direct core compartment drain fluid (e.g., oil, water, etc.) into downstream holes that can create safety hazard risk situations by enables the drain fluid to renter the engine and interact with the core components.

BRIEF DESCRIPTION

According to some embodiments, core housings for gas turbine engines are provided. The core housings include a housing surface defining an exterior surface of the core housing, a housing aperture arranged on the housing surface, the housing aperture configured to enable fluid communication between an external environment and an interior of the core housing, a drainage hole arranged upstream relative to the housing aperture, the drainage hole configured to enable draining of a fluid from an interior of the core housing to the external environment, and a redirection device arranged to receive a fluid from the drainage hole and direct such fluid away from the housing aperture.

In addition to one or more of the features described above, or as an alternative, further embodiments of the core housings may include that the redirection device is mounted to the housing surface.

In addition to one or more of the features described above, or as an alternative, further embodiments of the core housings may include that the redirection device is integrally formed with the core housing.

In addition to one or more of the features described above, or as an alternative, further embodiments of the core housings may include that the redirection device has a channel body defining a channel extending between a channel inlet and a channel outlet.

In addition to one or more of the features described above, or as an alternative, further embodiments of the core housings may include that the channel inlet is arranged proximate the drainage hole and at least partially covering the drainage hole.

In addition to one or more of the features described above, or as an alternative, further embodiments of the core housings may include that the channel inlet is a closed channel inlet.

In addition to one or more of the features described above, or as an alternative, further embodiments of the core housings may include that the channel body tapers from the channel inlet to the channel outlet.

In addition to one or more of the features described above, or as an alternative, further embodiments of the core housings may include that the channel inlet has an inlet height defined from the housing surface and the channel outlet has an outlet height defined from the housing surface, wherein the inlet height is less than the outlet height.

In addition to one or more of the features described above, or as an alternative, further embodiments of the core housings may include that the channel body comprises a first section and a second section, wherein the first section includes the channel inlet and the second section includes the channel outlet.

In addition to one or more of the features described above, or as an alternative, further embodiments of the core housings may include that the first section extends in a first axial direction and the second section extends in a second axial direction, wherein the first axial direction is different from the second axial direction.

In addition to one or more of the features described above, or as an alternative, further embodiments of the core housings may include that the first section and the second section form a continuous, curved channel body.

In addition to one or more of the features described above, or as an alternative, further embodiments of the core housings may include that a cross-sectional area of the channel is equal to or greater than 0.6 times a cross-sectional area of the drainage hole.

In addition to one or more of the features described above, or as an alternative, further embodiments of the core housings may include that the redirection device is formed from the same material as the core housing.

In addition to one or more of the features described above, or as an alternative, further embodiments of the core housings may include that the redirection device is formed from a material different than the core housing.

In addition to one or more of the features described above, or as an alternative, further embodiments of the core housings may include that the redirection device is attached to the housing surface by at least one of an adhesive, bonding, welding, and a mechanical fastener.

In addition to one or more of the features described above, or as an alternative, further embodiments of the core housings may include that the redirection device is mounted to the housing surface at at least one of a gravitational low point and a geometric low point of the core housing.

In addition to one or more of the features described above, or as an alternative, further embodiments of the core housings may include one or more core components installed within the core housing.

In addition to one or more of the features described above, or as an alternative, further embodiments of the core housings may include that the one or more core components comprise a gas turbine engine.

According to some embodiments, gas turbine engines are provided. The gas turbine engines include a core housing. The core housing has a housing surface defining an exterior surface of the core housing, a housing aperture arranged on the housing surface, the housing aperture configured to enable fluid communication between an external environment and an interior of the core housing, a drainage hole arranged upstream relative to the housing aperture, the drainage hole configured to enable draining of a fluid from an interior of the core housing to the external environment, and a redirection device arranged to receive a fluid from the drainage hole and direct such fluid away from the housing aperture. One or more core components are mounted within the core housing with a nacelle arranged about the core housing. A bifurcation structure is positioned to extend between and connecting the core housing to the nacelle, wherein the core housing is mounted within the nacelle by at least the bifurcation structure. The redirection device is positioned proximate a juncture between the bifurcation structure and the core housing.

In addition to one or more of the features described above, or as an alternative, further embodiments of the gas turbine engine may include that the external environment is a bypass flow path define between the housing surface and an interior surface of the nacelle.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
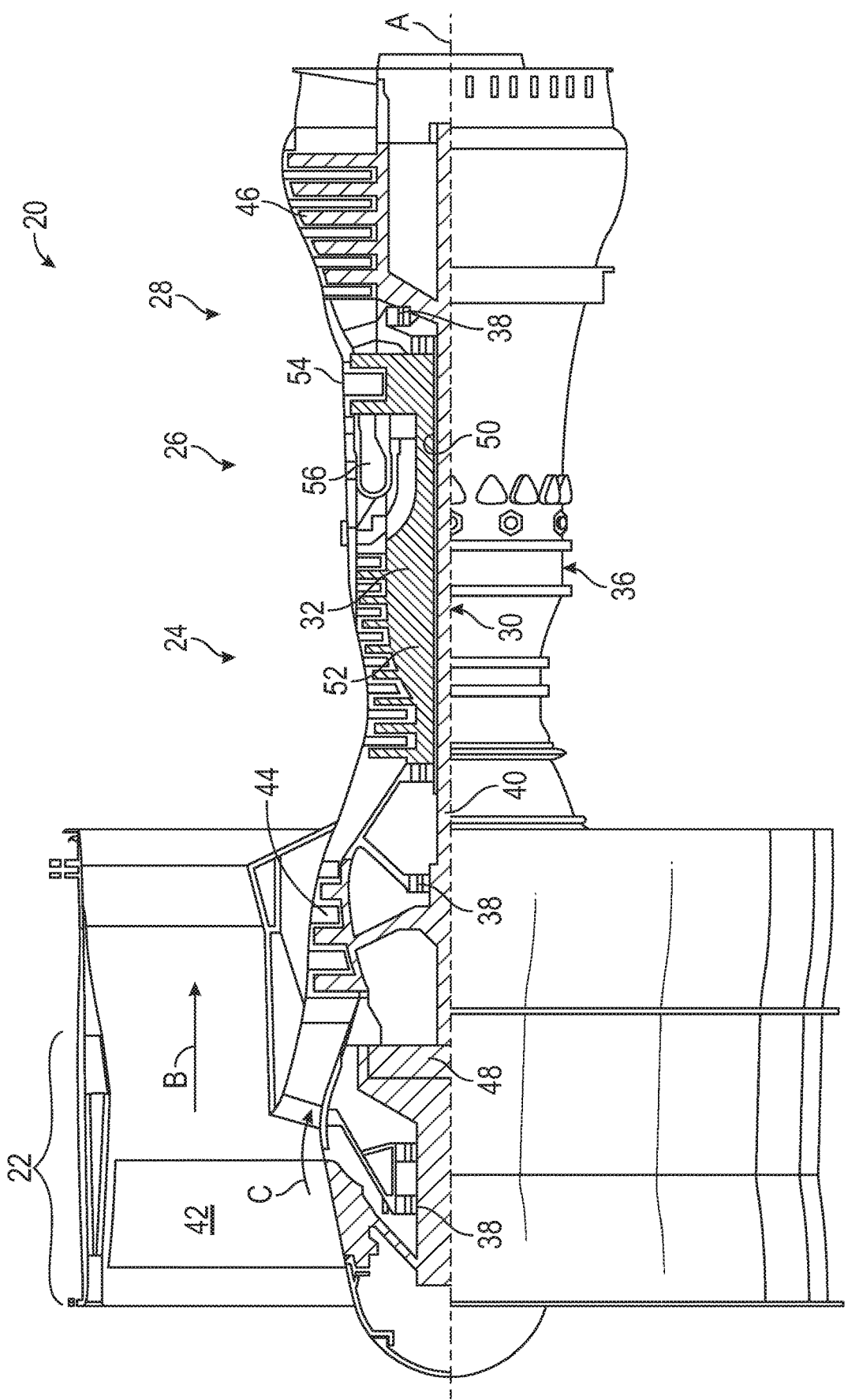
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one non-limiting example is a high-bypass geared aircraft engine. In a further non-limiting example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption (' TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(514.7° R)]0.5. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
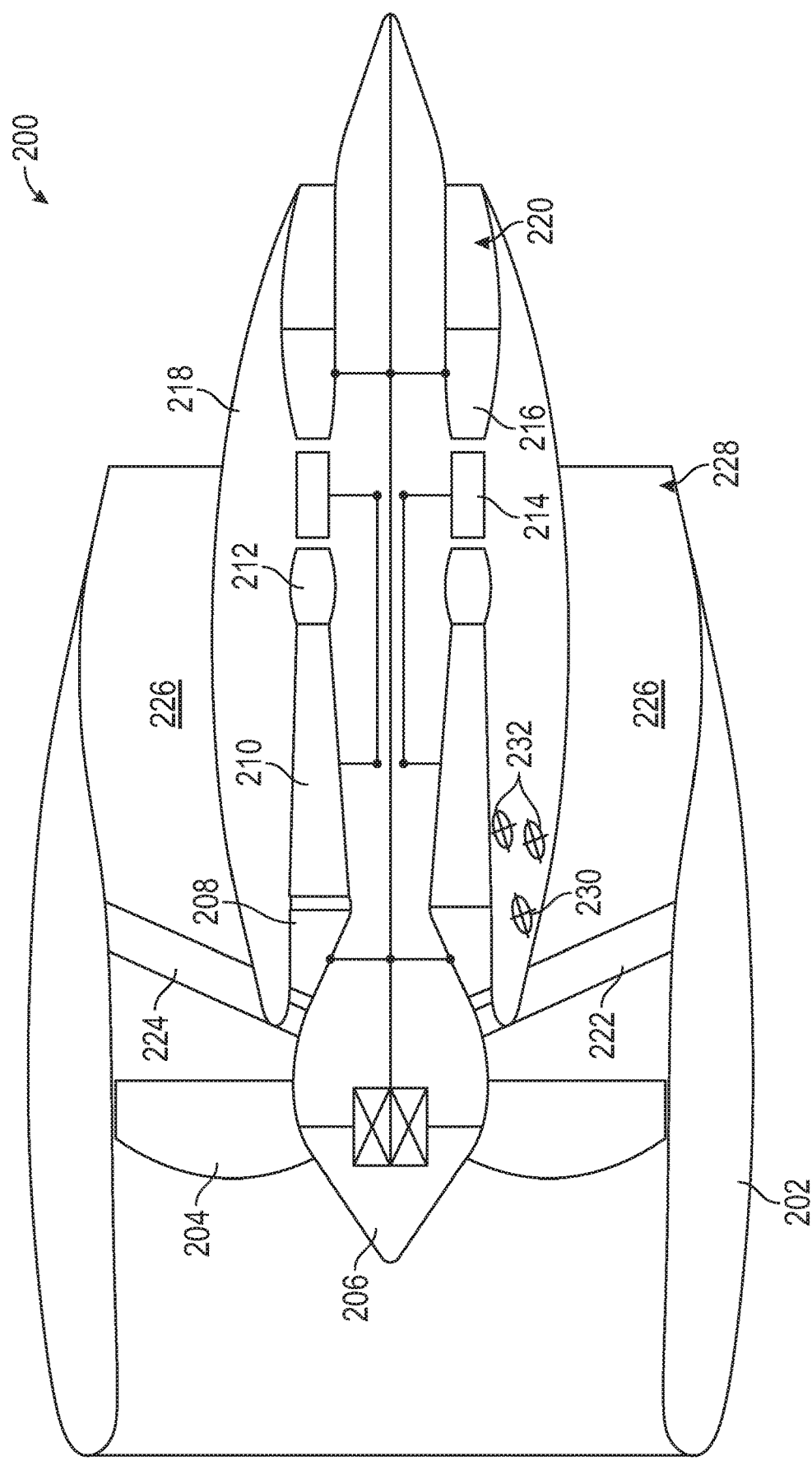
FIG. 2 is a schematic illustration of a gas turbine engine in accordance with an embodiment of the present disclosure.

Referring now to FIG. 2, a schematic illustration of a gas turbine engine 200 is shown. The gas turbine engine 200 may be similar to that shown and described with respect to FIG. 1. As shown, the gas turbine engine 200 includes a nacelle 202 with a fan 204 located therein. The fan 204 is operably connected to core components 206 of the gas turbine engine 200. The core components 206 include a low pressure compressor section 208, a high pressure compressor section 210, a combustor section 212, a high pressure turbine 214, and a low pressure turbine 216. The core components 206 are housed within a core housing 218 which defines a flow path through the core components 206 for operation of the gas turbine engine 200. Exhaust from the core components 206 exits the core housing 218 through a core nozzle 220.

The core components 206 within the core housing 218 are mounted within the nacelle 202. As shown, the core housing 218 is attached to the nacelle 202 by a lower bifurcation structure 222 and an upper bifurcation structure 224. A bypass flow path 226 is defined between the exterior of the core housing 218 and the nacelle 202 to enable bypass air to flow therethrough. The bypass air exits the bypass flow path 226 through a bypass duct nozzle 228. The lower and upper bifurcation structures 222, 224 are configured to fixedly mount the core components 206 within the nacelle 202 and are configured to aerodynamically divide the bypass flow through the bypass flow path 226.

As noted above, fluids may leak from the core components 206 and flow along an exterior surface of the core housing 218 (i.e., within the bypass flow path 226). In operation, due to the airflow through the bypass flow path 226, the leaking fluid will flow aftward toward the bypass duct nozzle 228 along the exterior surface of the core housing 218. Although the fluid may leak through seams, junctions, or joints, the flow of fluid exiting the core housing 218 may be controlled by drainage holes 230 formed in the core housing 218. The placement of the drainage holes 230 may be selected to prevent the fluid from interacting with one or more housing apertures 232 that are located downstream from the drainage holes 230. The housing apertures 232 may be inlets or outlets for fluid flow associated with the core components 206. For example, in some configurations, one or more housing apertures 232 may be configured as scoops for capturing and directly air from the bypass flow path 226 into the core housing 218 to interact with one or more of the core components 206 (e.g., for cooling). In other configurations, one or more housing apertures 232 may be configured as outlets for ejecting hot air from one or more of the core components 206. Those of skill in the art will appreciate that the housing apertures 232 may be inlets or outlets arranged for other purposes, without departing from the scope of the present disclosure. The housing apertures 232 provide for fluid communication between the bypass flow path 226 (or other external environment) and one or more of the core components 206 (or the interior of the core housing 218).

The location of the housing apertures 232 and the drainage holes 230 may be dictated by requirements for flow through the housing apertures 232 and arranging the drainage holes 230 at a low point on the core housing 218 to enable efficient bleeding of any fluids from the interior of the core housing 218 to the exterior thereof. Further, the location of the housing apertures 232 and/or the drainage holes 230 may be dependent upon the location and structure of the lower bifurcation structure 222 which will impact the airflow of the bypass air within the bypass flow path 226.

In accordance with embodiments of the present disclosure, redirection devices are provided to redirect an outward flow of a liquid through the drainage holes 230. The redirection devices may be configured to collect, direct, and/or expel fluid in a direction away from the housing apertures 232. Thus, the redirection devices of the present disclosure are configured to prevent ingestion or reinjection of the fluid into the core housing 218 and the prevent interaction of such fluid with one or more of the core components 206.

Figure 3:
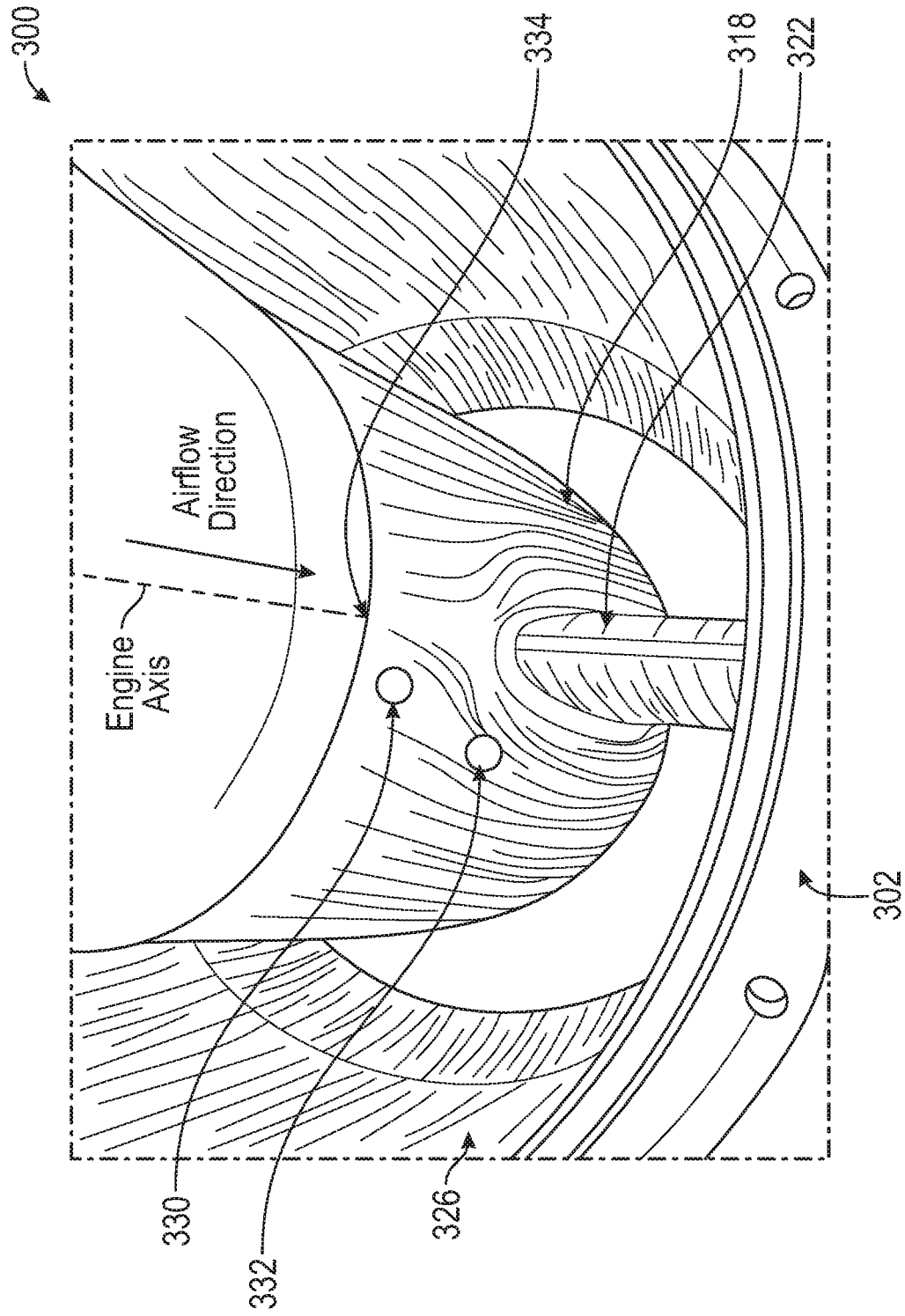
FIG. 3 is a partial isometric illustration of a bypass flow path of a gas turbine engine in accordance with an embodiment of the present disclosure.

Turning now to FIG. 3, a schematic illustration of a gas turbine engine 300 is shown. The view shown in FIG. 3 is a partial isometric illustration of the bypass flow path 326 of the gas turbine engine 300. The gas turbine engine 300 may be substantially similar to that shown and described above. The gas turbine engine 300 includes a nacelle 302 and a core housing 318 that are fixedly connected by a lower bifurcation structure 322. As shown, the core housing 318 has a low point 334 where fluids of core components within the core housing 318 may collect (e.g., gravitational or geometric low point of the core housing 318). In this illustration a drainage hole 330 is arranged to extract and remove the fluid from the core housing 318. The drainage hole 330, as shown, is located proximate the low point 334 of the core housing 318. The core housing 318 further includes a housing aperture 332, which may be configured as an outlet or vent or may be configured as an inlet or scoop (e.g., depending on the specific engine configuration).

As shown, the drainage hole 330 is located upstream of the housing aperture 332. Thus, fluid that may drain from and through the drainage hole 330 may flow aftward toward the housing aperture 332. Without a redirection device of the present disclosure, the fluid could be reintroduced into the interior of the core housing 318, which is undesirable. Accordingly, a redirection device may be formed about the drainage hole 330 to redirect such drained fluid such that it does not reenter the core housing 318 through the housing aperture 332. It will be appreciated that FIG. 3 is merely illustrative, and is not to be limiting. For example, the number of drainage holes 330 and/or the number of housing apertures 332, and the locations thereof, may be varied and may be dependent, in part, upon a given engine configuration.

Figure 4A:
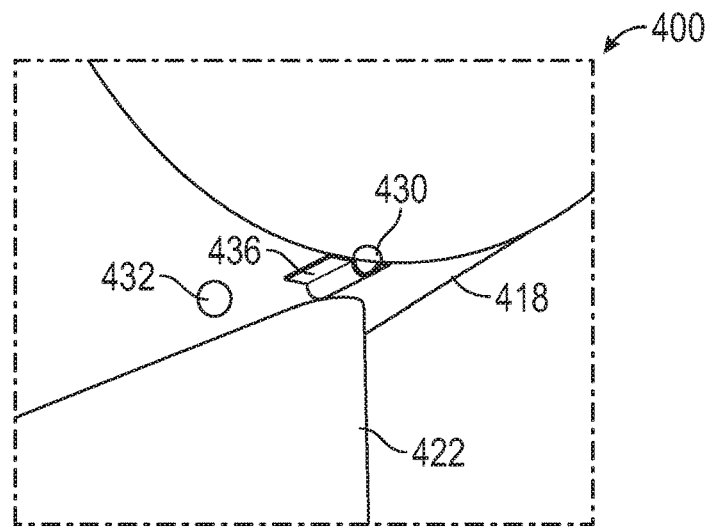
FIG. 4A is an isometric illustration of a redirection device mounted to a core housing in accordance with an embodiment of the present disclosure.
Figure 4B:
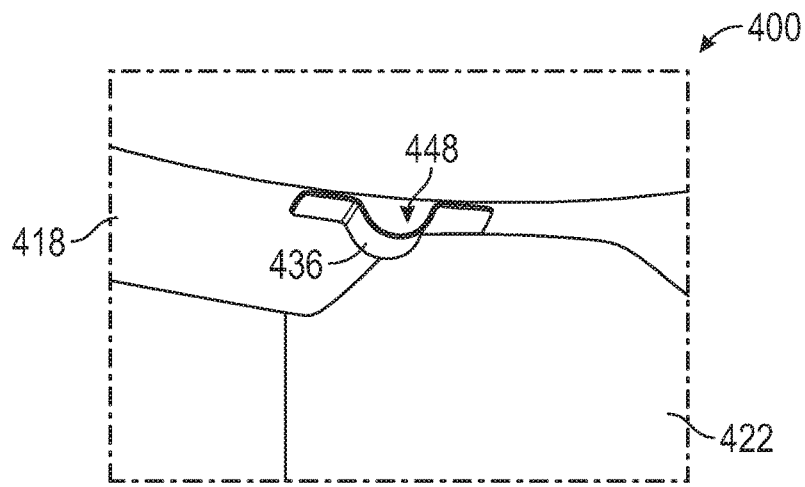
FIG. 4B is an alternative view of the redirection device of FIG. 4A.
Figure 4C:
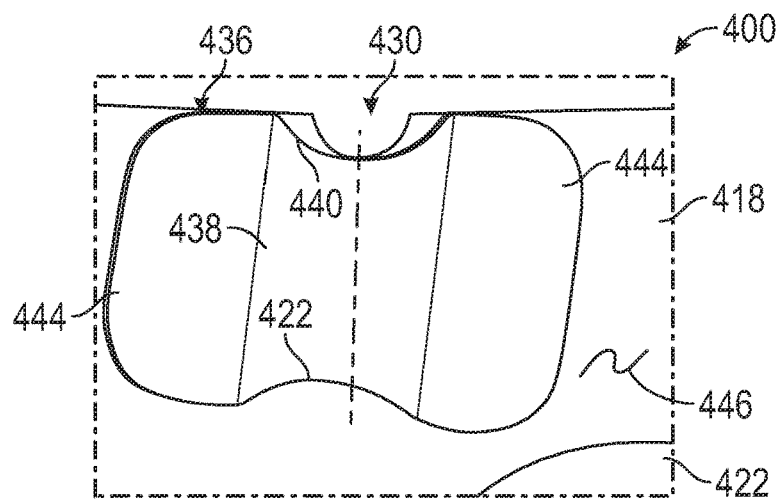
FIG. 4C is another alternative view of the redirection device of FIG. 4A.

Turning now to FIGS. 4A-4C, schematic illustrations of a gas turbine engine 400 having a redirection device 436 in accordance with an embodiment of the present disclosure are shown. FIG. 4A is a partial isometric illustration of a core housing 418 with a lower bifurcation structure 422 extending therefrom (and connecting the core housing 418 to a nacelle, as shown and described above). FIGS. 4B-4C are enlarged illustrations of the redirection device 436 as mounted to an exterior of the core housing 418.

As shown in FIG. 4A, the core housing 418 includes a drainage hole 430 and a housing aperture 432. The housing aperture 432 is located downstream from the drainage hole 430 and may provide for an inlet or an outlet of air to core components within the core housing 418, as described above. The redirection device 436 is mounted, affixed, or otherwise attached to the core housing 418 (or may be integrally formed therewith) and positioned about the drainage hole 430. For example, in some embodiments, the redirection device 436 may be a sheet metal component that is soldered, welded, or otherwise affixed to an exterior surface of the core housing 418. In some embodiments, adhesives or other bonding mechanisms may be employed. Further, in some embodiments, fasteners or other mechanical fixing mechanisms may be employed. Still, in other embodiments, the redirection device 436 may be formed of machined material of the core housing 418, or may be stamped or otherwise formed. Further still, the core housing 418 may be additively manufactured to have the redirection device 436 formed therewith. In some embodiments, the redirection device may be formed from the same material as the core housing, and in other embodiments, the material of the redirection device may be different from that material of the core housing.

In the illustrative embodiments of FIGS. 4A-4C, the redirection device 436 has a channel body 438 that extends between a channel inlet 440 and a channel outlet 442. The channel body 438 also has mounting elements 444 extending therefrom to enable mounting to a housing surface 446 of the core housing 418. The channel body 438 defines a channel 448 or fluid path for directing flow therethrough. The channel inlet 440 is arranged proximate the drainage hole 430 such that fluid flowing through the drainage hole 430 will enter the channel 448 (shown in FIG. 4B) and flow along and/or through the channel 448 and exit the channel outlet 442. As shown in FIG. 4A, the redirection device 436 is arranged to ensure redirection of any fluid away from the housing aperture 432.

Figure 5A:
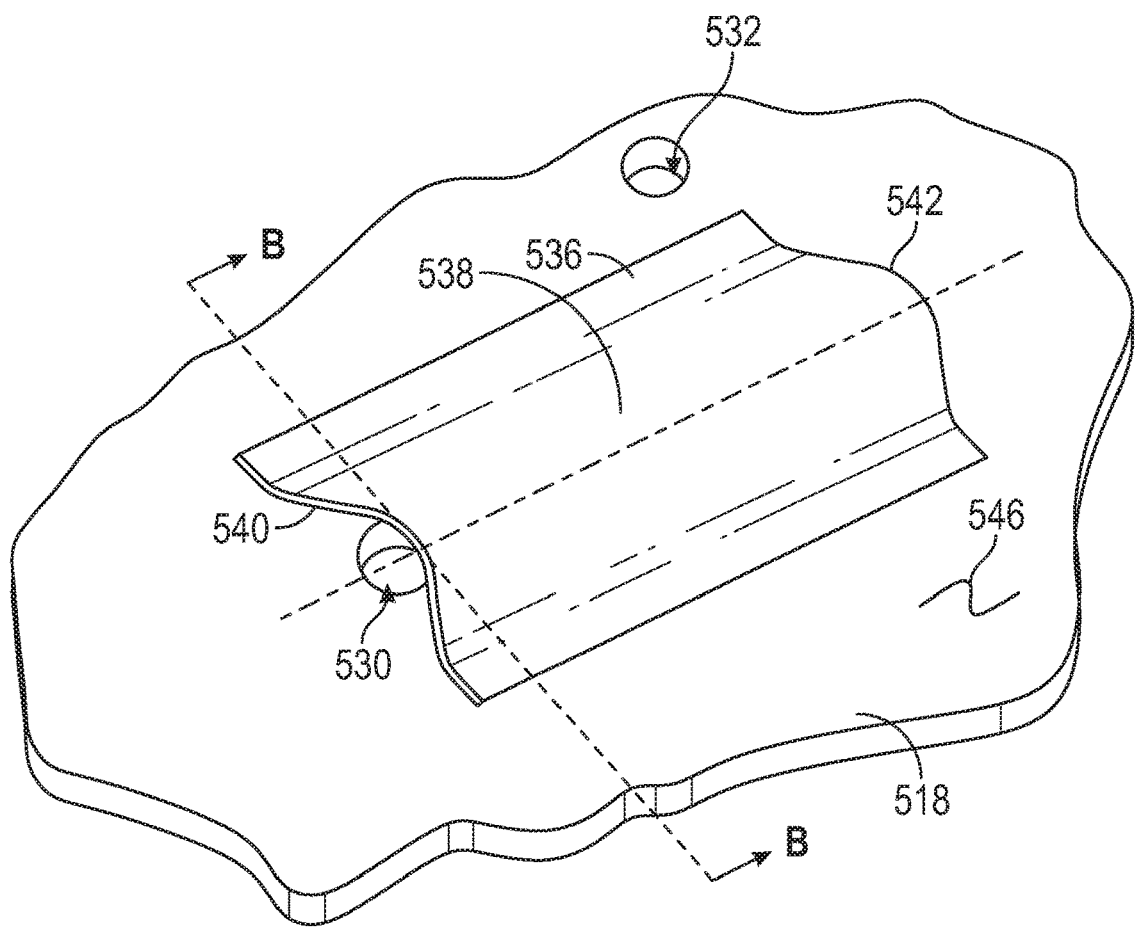
FIG. 5A is a schematic illustration of a redirection device in accordance with an embodiment of the present disclosure.
Figure 5B:
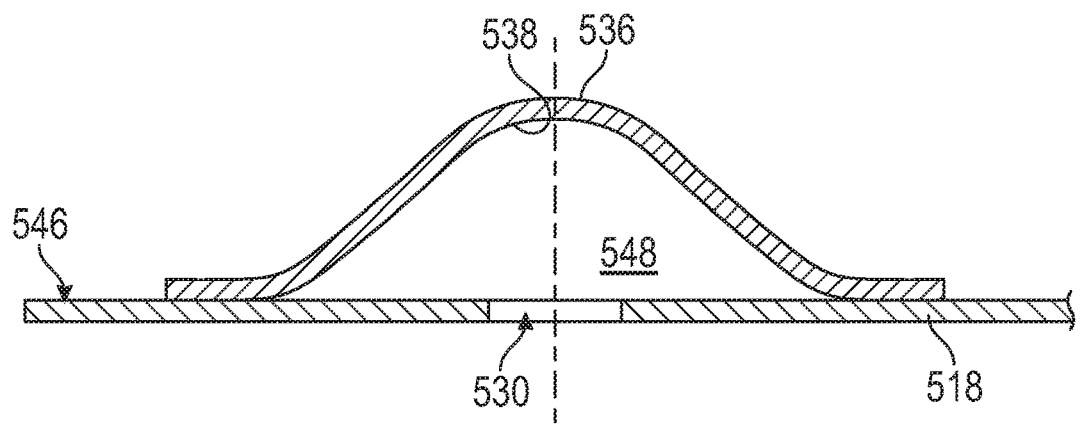
FIG. 5B is a cross-sectional illustration of the redirection device of FIG. 5A as viewed along the line B-B thereof.

Turning now to FIGS. 5A-5B, schematic illustrations of a redirection device 536 are shown. The redirection device 536 is mountable and/or part of a core housing 518, as shown and described above. Specifically, in this non-limiting illustrative embodiment, the redirection device 536 is mounted to and affixed to a housing surface 546 of the core housing 518. FIG. 5A illustrates an isometric view of the redirection device 536 and FIG. 5B illustrates a cross-sectional illustration of the redirection device 536 as viewed along the line B-B shown in FIG. 5A.

The redirection device 536 has a channel body 538 extending between a channel inlet 440 and a channel outlet 442. The redirection device 536 is positioned such that the channel inlet 440 is located proximate to, and at least partially covering, a drainage hole 530 formed in the core housing 518. The position and arrangement of the redirection device 536 is such that the redirection device 536 can receive, channel, and direct fluids from the drainage hole 530 away from a housing aperture 532. The housing aperture 532 may be an inlet or outlet for air or other fluids and may be configured for enabling a cooling process associated with one or more core components housed within the core housing 518.

As shown in FIG. 5B, the redirection device 536 defines a channel 548 through which fluid may be directed. Fluid may enter the channel 548 from the drainage hole 530 at a channel inlet 540 and flow along the channel body 538 toward a channel outlet 542. The fluid may then exit the channel outlet 542 and flow along the housing surface 546, but will not interact with (e.g., enter) the housing aperture 532. In FIG. 5A, the channel outlet 542 is shown approximately even with the housing aperture 532, however, such arrangement is not to be limiting. In some embodiments, the location of the channel outlet 542 (and thus the length of the channel body 538) may be located downstream of the housing aperture 532. In other embodiments, the channel outlet 542 may be arranged upstream of the housing aperture 532, but the arrangement and configuration of the redirection device 536 is such that fluid flowing from the drainage hole 530 is directed away from the housing aperture 532, thus preventing any such fluids from entering into the core housing 518 through the housing aperture 532.

Figure 6:
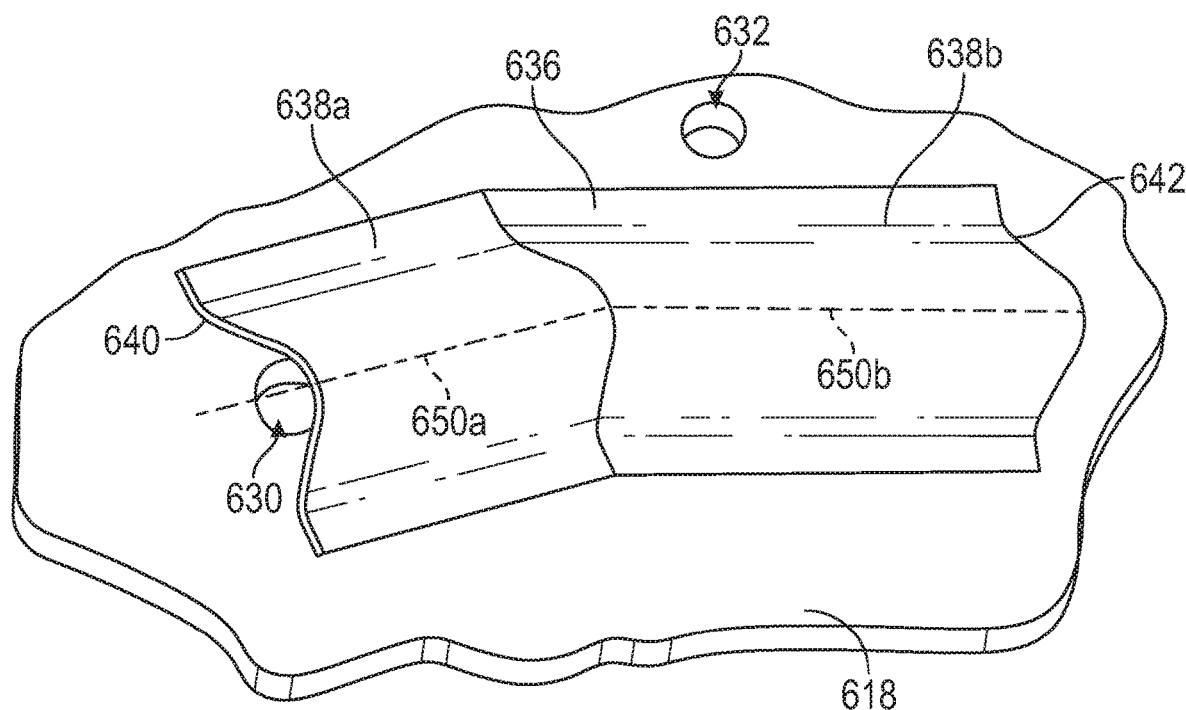
FIG. 6 is a schematic illustration of a redirection device in accordance with an embodiment of the present disclosure.

Turning now to FIG. 6, an alternative configuration of a redirection device 636 in accordance with an embodiment of the present disclosure is shown. The redirection device 636 may be similar in structure and function to that shown and described above. In this embodiment, the redirection device 636 includes a first section 638*a* and a second section 638*b* forming a channel body of the redirection device 636. In this illustration, the first section 638*a* is arranged proximate and at least partially covering a drainage hole 630 formed in a core housing 618. The first section 638*a* of the channel body defines, in part, a channel inlet 640. Fluid entering the redirection device 636 from the drainage hole 630 will enter the first section 638a and flow toward the second section 638b. The second section 638b is arranged to redirect a fluid flow such that fluid exiting the redirection device 636 will be directed away from a housing aperture 632, as described above. The fluid will then exit the redirection device 636 through a channel outlet 642, which is defined by the second section 638b of the channel body.

In this non-limiting, illustrative embodiment, the redirection device 636 is formed from two distinct sections 638a, 638b that form the channel body. As shown, the first section 638a extends in a first axial direction 650a and the second section 638b extends in a second axial direction 650b. The selection of the first and second axial directions 650a, 650b may be based, in part, on aerodynamics, fluid flow, and/or other considerations. For example, the first axial direction 650a may be selected to minimize entrance drag at the channel inlet 640, and the second axial direction 650b may be selected to ensure no fluid exiting the redirection device 636 will interact with (e.g., enter) the housing aperture 632. As such, the first axial direction 650a may be different than the second axial direction 650b. Although shown illustratively as two separate sections 638a, 638b, in other embodiments, the channel body may be formed as a single unitary piece that is curved and transitions from a first axial direction at the channel inlet to a second axial direction at the channel outlet. Thus, the present illustration is not to be limiting, but rather is provided for illustrative and explanatory purposes.

Figure 7:
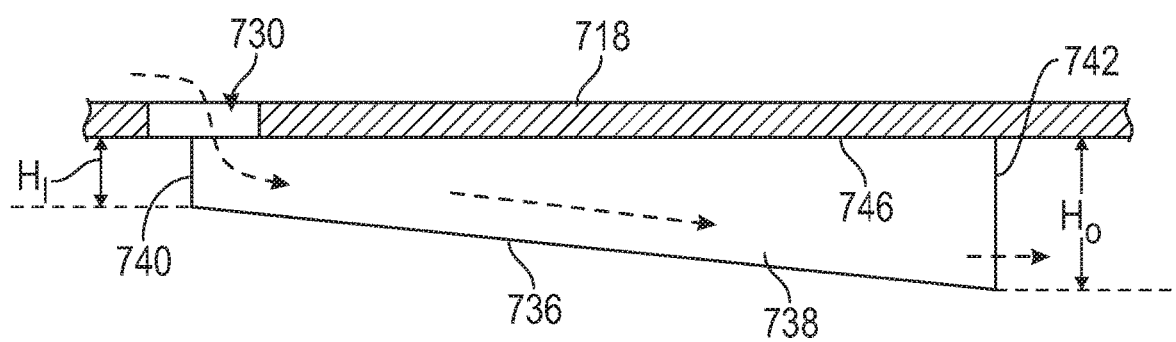
FIG. 7 is a schematic illustration of a redirection device in accordance with an embodiment of the present disclosure.

Turning now to FIG. 7, an alternative configuration of a redirection device 736 in accordance with an embodiment of the present disclosure is shown. The redirection device 736 may be similar in structure and function to that shown and described above. In this embodiment, the redirection device 736 includes a tapered channel body 738. The taper channel body 738 extends between a channel inlet 740 and a channel outlet 742. The redirection device 736 is mounted to a housing surface 746 of a core housing 718. The channel inlet 740 is arranged proximate to and at least partially covering a drainage hole 730, as described above.

As shown, the channel inlet 740 of the channel body 738 has an inlet height HI as defined from the housing surface 746 of the core housing 718. The channel outlet 742 of the channel body 738 has an outlet height HO as defined from the housing surface 746 of the core housing 718. In this illustrative embodiment, the outlet height HO is greater than the inlet height HI, thus creating a tapered channel body 738. The taper of the channel body 738 may aid in the flow and directing of a fluid received from the drainage hole 730.

Figure 8A:
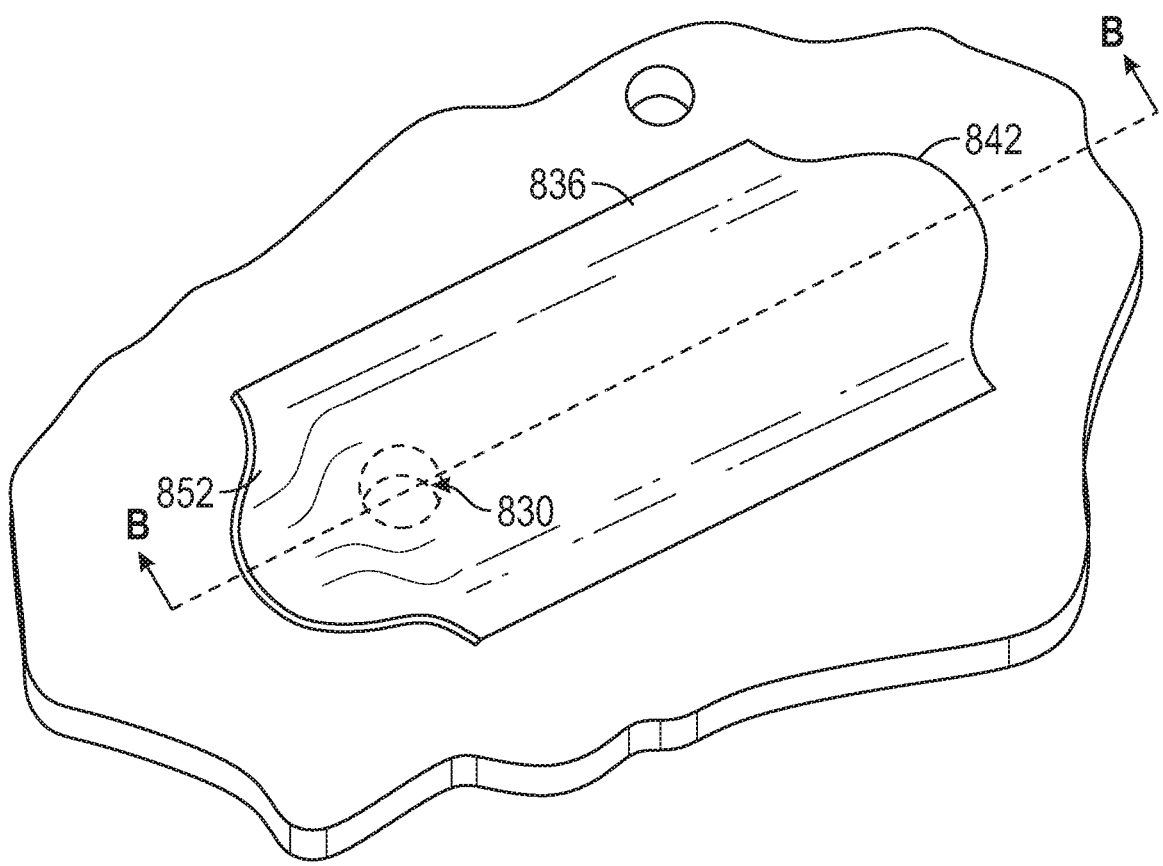
FIG. 8A is a schematic illustration of a redirection device in accordance with an embodiment of the present disclosure.
Figure 8B:
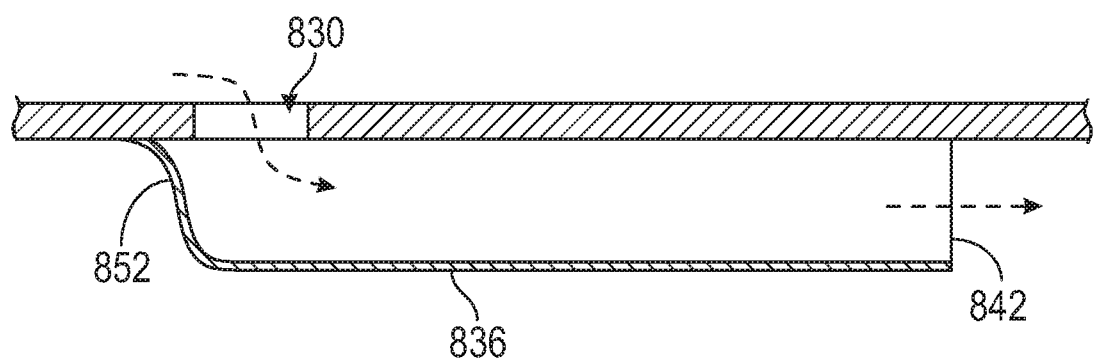
FIG. 8B is a cross-sectional illustration of the redirection device of FIG. 8A as viewed along the line B-B thereof.

Turning now to FIGS. 8A-8B, an alternative configuration of a redirection device 836 in accordance with an embodiment of the present disclosure is shown. The redirection device 836 may be similar in structure and function to that shown and described above. In this embodiment, the redirection device 836 includes a closed channel inlet 852. The closed channel inlet 852 may be configured to minimize drag at the closed channel inlet 852. A channel outlet 842 may remain open, and a suction force generated by airflow at the channel outlet 842 may, in part, cause a fluid from a drainage hole 830 to flow through the redirection device 836 and be directed away from a housing aperture, as described above.

Although shown and described with a limited number of embodiments, those of skill in the art will appreciate that combination of the features of various embodiments may be implemented without departing from the scope of the present disclosure. For example, a curved or two-axis, tapered redirection device with a closed channel inlet may be implemented. Further, other variations may be implemented without departing from the scope of the present disclosure. For example, a taper in the opposing direction to that shown in FIG. 7 may be employed. Further, a substantially closed channel outlet may be employed, with a hole formed in a surface of the redirection device, the hole arranged to provide an outlet for fluid within the redirection device.

Further, in some embodiments, the cross-sectional area of the channel (e.g., channel 548 shown in FIG. 5B) may be configured with a specific cross-sectional area related to the area of the drainage hole (e.g., drainage hole 530 shown in FIG. 5B). For example, in one non-limiting embodiments, the cross-sectional area of the channel may be 0.6 times (or greater than) the cross-sectional area of the drainage hole. It will be appreciated that the cross-sectional area of the channel will be the area shown in FIG. 5B, and the cross-sectional area of the drainage hole will be equal to $A=\pi r^2$, where r is the radius of the drainage hole.

Advantageously, embodiments described herein provide for improved drainage of fluids from core components of a gas turbine engine. Advantageously, embodiments described here can allow for optimum or desired core compartment ventilation holes and scoops (i.e., housing apertures) while mitigating risks associated with re-injection of fluids that drain from the core components.

Although the various above embodiments are shown as separate illustrations, those of skill in the art will appreciate that the various features can be combined, mix, and matched to form an airfoil having a desired cooling scheme that is enabled by one or more features described herein. Thus, the above described embodiments are not intended to be distinct arrangements and structures of airfoils and/or core structures, but rather are provided as separate embodiments for clarity and ease of explanation.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A core housing for a gas turbine engine, the core housing comprising:
a housing surface defining an exterior surface of the core housing; a housing aperture arranged on the housing surface, the housing aperture configured to enable fluid communication between an external environment and an interior of the core housing;
a drainage hole arranged upstream relative to the housing aperture, the drainage hole configured to enable draining of a fluid from the interior of the core housing to the external environment; and
a redirection device arranged to receive the fluid from the drainage hole and direct said fluid away from the housing aperture,
wherein the redirection device has a channel body defining a channel extending between a channel inlet and a channel outlet,
wherein the channel body comprises a first section and a second section, wherein the first section includes the channel inlet and the second section includes the channel outlet, and
wherein the first section extends in a first axial direction and the second section extends in a second axial direction, wherein the first axial direction is different from the second axial direction.

2. The core housing of claim 1, wherein the redirection device is mounted to the housing surface.

3. The core housing of claim 1, wherein the redirection device is integrally formed with the core housing.

4. The core housing of claim 1, wherein the channel inlet is arranged proximate the drainage hole and at least partially covering the drainage hole.

5. The core housing of claim 1, wherein the channel inlet is a closed channel inlet.

6. The core housing of claim 1, wherein the channel body tapers from the channel inlet to the channel outlet.

7. The core housing of claim 6, wherein the channel inlet has an inlet height defined from the housing surface and the channel outlet has an outlet height defined from the housing surface, wherein the inlet height is less than the outlet height.

8. The core housing of claim 1, wherein the first section and the second section form a continuous, curved channel body.

9. The core housing of claim 1, wherein a cross-sectional area of the channel is equal to or greater than 0.6 times a cross-sectional area of the drainage hole.

10. The core housing of claim 1, wherein the redirection device is formed from the same material as the core housing.

11. The core housing of claim 1, wherein the redirection device is formed from a material different than the core housing.

12. The core housing of claim 1, wherein the redirection device is attached to the housing surface by at least one of an adhesive, bonding, welding, and a mechanical fastener.

13. The core housing of claim 1, wherein the redirection device is mounted to the housing surface at at least one of a gravitational low point and a geometric low point of the core housing.

14. The core housing of claim 1, further comprising one or more core components installed within the core housing.

15. The component of claim 14, wherein the one or more core components comprise the gas turbine engine.

16. A gas turbine engine comprising:
a core housing, the core housing comprising:
a housing surface defining an exterior surface of the core housing;
a housing aperture arranged on the housing surface, the housing aperture configured to enable fluid communication between an external environment and an interior of the core housing;
a drainage hole arranged upstream relative to the housing aperture, the drainage hole configured to enable draining of a fluid from the interior of the core housing to the external environment; and
a redirection device arranged to receive the fluid from the drainage hole and direct said fluid away from the housing aperture;
one or more core components mounted within the core housing;
a nacelle arranged about the core housing; and
a bifurcation structure extending between and connecting the core housing to the nacelle, wherein the core housing is mounted within the nacelle by at least the bifurcation structure,
wherein the redirection device is positioned proximate a juncture between the bifurcation structure and the core housing.

17. The gas turbine engine of claim 16, wherein the external environment is a bypass flow path define between the housing surface and an interior surface of the nacelle.

18. The gas turbine engine of claim 16, wherein the redirection device is at least one of mounted to the housing surface and integrally formed with the core housing.

19. The gas turbine engine of claim 16, wherein the redirection device is one of formed from the same material as the core housing and formed from a material different than the core housing.

20. The gas turbine engine of claim 16, wherein the redirection device is attached to the housing surface by at least one of an adhesive, bonding, welding, and a mechanical fastener.

* * * * *